US012574175B2

(12) United States Patent
Liu et al.

(10) Patent No.: US 12,574,175 B2
(45) Date of Patent: Mar. 10, 2026

(54) DATA TRANSMISSION METHOD, VEHICLE-SIDE DEVICE, AND NETWORK SIDE DEVICE

(71) Applicant: Shenzhen Yinwang Intelligent Technologies Co., Ltd., Shenzhen (CN)

(72) Inventors: Jianqin Liu, Beijing (CN); Yuehua Li, Beijing (CN)

(73) Assignee: SHENZHEN YINWANG INTELLIGENT TECHNOLOGIES CO. LTD., Shenzhen (CN)

( * ) Notice: Subject to any disclaimer, the term of this patent is extended or adjusted under 35 U.S.C. 154(b) by 527 days.

(21) Appl. No.: 17/903,118

(22) Filed: Sep. 6, 2022

(65) Prior Publication Data

US 2022/0416974 A1      Dec. 29, 2022

Related U.S. Application Data

(63) Continuation of application No. PCT/CN2020/078231, filed on Mar. 6, 2020.

(51) Int. Cl.
*H04L 5/00* (2006.01)
*H04W 4/38* (2018.01)
*H04W 4/40* (2018.01)

(52) U.S. Cl.
CPC ............. *H04L 5/0048* (2013.01); *H04W 4/38* (2018.02); *H04W 4/40* (2018.02)

(58) Field of Classification Search
CPC ........................... H04L 5/0048; H04W 4/0038
USPC ......................................................... 370/329
See application file for complete search history.

(56) References Cited

U.S. PATENT DOCUMENTS

| | | | | |
|---|---|---|---|---|
| 7,099,625 B1 * | 8/2006 | Yoshida | ................ | H04W 28/26 |
| | | | | 455/446 |
| 8,935,036 B1 | 1/2015 | Christensen et al. | | |
| 2014/0094992 A1 * | 4/2014 | Lambert | ................ | G07C 5/008 |
| | | | | 701/1 |
| 2016/0042644 A1 | 2/2016 | Velusamy | | |
| 2019/0176688 A1 * | 6/2019 | Yoon | ..................... | B60K 35/00 |
| 2019/0384320 A1 | 12/2019 | Lee | | |
| 2020/0073376 A1 | 3/2020 | Yang | | |

FOREIGN PATENT DOCUMENTS

| | | | | |
|---|---|---|---|---|
| CN | 101670830 A | 3/2010 | | |
| CN | 103884344 A | 6/2014 | | |
| CN | 105513378 A | 4/2016 | | |
| CN | 106817409 A | 6/2017 | | |
| CN | 107784850 A | 3/2018 | | |
| CN | 107894768 A | 4/2018 | | |
| CN | 109739236 A | 5/2019 | | |
| CN | 109872567 A | 6/2019 | | |
| EP | 3451104 A1 * | 3/2019 | ............. | B60K 35/00 |
| JP | 2004054369 A | 2/2004 | | |
| JP | 2012118767 A | 6/2012 | | |
| KR | 20150015888 A | 2/2015 | | |

* cited by examiner

*Primary Examiner* — Angel T Brockman
(74) *Attorney, Agent, or Firm* — Conley Rose, P.C.

(57) ABSTRACT

A data transmission method includes a vehicle-side device that sends, to a network side device, a first message to obtain vehicle driving-related information. The vehicle-side device receives, from the network side device, a second message including the vehicle driving-related information, where content or a format of the second message is determined by the network side device based on the first message.

20 Claims, 5 Drawing Sheets

| Autonomous vehicle | | Cloud server |
|---|---|---|

S13: Send a first message including an instruction content type

S14: Determine adjustment information based on a preset mapping relationship

S15: Send the adjustment information

DATA TRANSMISSION METHOD, VEHICLE-SIDE DEVICE, AND NETWORK SIDE DEVICE

CROSS-REFERENCE TO RELATED APPLICATIONS

This application is a continuation of International Patent Application No. PCT/CN2020/078231 filed on Mar. 6, 2020, the disclosure of which is hereby incorporated by reference in its entirety.

TECHNICAL FIELD

This disclosure relates to the internet of vehicles field, and in particular, to a data transmission method, a network side device, and a vehicle-side device.

BACKGROUND

An autonomous driving technology has become a hotspot in development of new automobile technologies, and how to ensure safe and reliable driving of a vehicle and ensure safety of a passenger, another vehicle, a pedestrian, and the like is a focus in the hotspot.

In the conventional technology, a network side device transmits, periodically or in real time, road condition dynamic information collected by the network side device to a vehicle-side device disposed in a vehicle. That is, in the conventional technology, the network side device sends all the collected dynamic information to the vehicle-side device, and the vehicle-side device passively determines and executes a corresponding driving policy based on all the received dynamic information.

However, in a process of implementing this disclosure, the foregoing manner in the conventional technology has at least the following disadvantage. Because the vehicle-side device passively receives all the dynamic information sent by the network side device, efficiency of data transmission between the vehicle-side device and the network side device is low.

SUMMARY

To resolve the foregoing technical problem, embodiments of this disclosure provide a data transmission method, a network side device, and a vehicle-side device.

According to one aspect of embodiments of this disclosure, an embodiment of this disclosure provides a data transmission method. The method may be applied to a vehicle-side device, and the method includes the following steps.

The vehicle-side device sends, to a network side device, a first message used to obtain vehicle driving-related information.

The vehicle-side device receives, from the network side device, a second message including the vehicle driving-related information, where content or a format of the second message is determined by the network side device based on the first message.

In this embodiment of this disclosure, the vehicle-side device sends, to the network side device, the first message used to obtain the vehicle driving-related information, so that the vehicle-side device can actively and selectively obtain the vehicle driving-related information from the network side device, to improve intelligence of interaction between the vehicle-side device and the network side device.

In addition, because the vehicle-side device can selectively obtain the vehicle driving-related information from the network side device, a problem that data obtained by the vehicle-side device in the conventional technology is redundant can be avoided, and a problem that there is a long delay when the vehicle-side device obtains all data in the conventional technology can be further avoided, to achieve a technical effect of improving information transmission efficiency.

In some embodiments, the first message includes vehicle driving-related information reported or requested by the vehicle-side device to the network side device.

In this embodiment of this disclosure, the vehicle-side device may interact with the network side device in two manners: "reporting" and "requesting", so that flexibility and diversity of the interaction can be implemented, and flexibility and diversity of obtaining the vehicle driving-related information can be further implemented.

In some embodiments, the reported vehicle driving-related information includes at least one of an autonomous driving level of a vehicle to which the vehicle-side device belongs, a lane on which the vehicle to which the vehicle-side device belongs is located, or a current vehicle speed of the vehicle to which the vehicle-side device belongs.

In some embodiments, the requested vehicle driving-related information includes a content type or a level of detail of the vehicle driving-related information.

In some embodiments, the first message carries the content type or the level of detail based on a predefined bit coding scheme.

In some embodiments, that content or a format of the second message is determined by the network side device based on the first message includes that the content of the second message is determined by the network side device as a road condition description or a driving operation instruction based on the first message, or the format of the second message is determined by the network side device as a human recognizable language or a machine recognizable language based on the first message.

In this embodiment of this disclosure, the content or the format of the second message is determined based on the first message, so that a technical effect that the vehicle-side device effectively and accurately identifies the second message can be ensured.

In some embodiments, that content or a format of the second message is determined by the network side device based on the first message includes that a binding relationship exists between the content or the format of the second message and the first message, and the content or the format of the second message is determined by the network side device based on the first message and the binding relationship.

In some embodiments, the second message includes vehicle driving-related information of a plurality of content types, and the first message is further used by the network side device to determine a transmission priority of vehicle driving-related information of each of the plurality of content types.

In this embodiment of this disclosure, important vehicle driving-related information can be received by the vehicle-side device in a transmission priority manner, to adaptively adjust, in time, a driving status of the vehicle to which the vehicle-side device belongs, so as to ensure a technical effect of safe driving.

In some embodiments, vehicle driving-related information of a content type with a higher transmission priority is transmitted in terms of a transmission time sequence, or has a higher level of detail in terms of content or a format.

In this embodiment of this disclosure, because the vehicle driving-related information of the content type with the higher transmission priority has the higher level of detail in terms of the content or the format, different information may have different levels of detail. Therefore, when the vehicle driving-related information is transmitted based on the level of detail, a disadvantage in the conventional technology in which a large quantity of transmission resources is consumed when the network side device transmits all vehicle driving-related information can be avoided, to achieve a technical effect of saving transmission resources.

In some embodiments, the first message includes a time period or a road section in which the vehicle to which the vehicle-side device belongs is driving, and that the network side device determines a transmission priority of vehicle driving-related information of each of the plurality of content types includes that the network side device determines the transmission priority of the vehicle driving-related information of each content type based on the time period or the road section.

According to another aspect of embodiments of this disclosure, an embodiment of this disclosure further provides a data transmission method. The method may be applied to a network side device, and the method includes the following steps.

The network side device receives a first message that is sent by a vehicle-side device and that is used to obtain vehicle driving-related information.

The network side device determines a second message including the vehicle driving-related information, where content or a format of the second message is determined by the network side device based on the first message.

The network side device sends the second message to the vehicle-side device.

The network side device includes but is not limited to a cloud server and a road side unit.

In some embodiments, the first message includes vehicle driving-related information reported or requested by the vehicle-side device to the network side device.

In some embodiments, the reported vehicle driving-related information includes at least one of an autonomous driving level of a vehicle to which the vehicle-side device belongs, a lane on which the vehicle to which the vehicle-side device belongs is located, or a current vehicle speed of the vehicle to which the vehicle-side device belongs, and that the network side device determines a second message including the vehicle driving-related information includes the following step.

The network side device determines the content or the format of the second message based on the at least one of the autonomous driving level of the vehicle to which the vehicle-side device belongs, the lane on which the vehicle to which the vehicle-side device belongs is located, or the current vehicle speed of the vehicle to which the vehicle-side device belongs.

In this embodiment of this disclosure, because formats of messages that can be identified by vehicles at different autonomous driving levels are different, for example, a vehicle at a level higher than L3 (for explanations, refer to descriptions in the embodiments) can identify a machine language, when an autonomous driving level of the vehicle to which the vehicle-side device belongs is higher than L3, it may be determined that the format of the second message is a format corresponding to the machine language. Therefore, in a manner of determining the content or the format of the second message in this embodiment of this disclosure, technical effects of validity and reliability of message identification performed by the vehicle-side device can be achieved.

In some embodiments, the requested vehicle driving-related information includes a content type or a level of detail of the vehicle driving-related information, and that the network side device determines a second message including the vehicle driving-related information includes the following step.

The network side device determines the content or the format of the second message based on the content type or the level of detail.

In some embodiments, the first message carries the content type or the level of detail based on a predefined bit coding scheme, and that the network side device determines a second message including the vehicle driving-related information includes the following steps.

The network side device determines the content type or the level of detail based on the first message and the predefined bit coding scheme.

The network side device determines the content or the format of the second message based on the content type or the level of detail.

In some embodiments, that content or a format of the second message is determined by the network side device based on the first message includes that the content of the second message is determined by the network side device as a road condition description or a driving operation instruction based on the first message, or the format of the second message is determined by the network side device as a human recognizable language or a machine recognizable language based on the first message.

In some embodiments, that content or a format of the second message is determined by the network side device based on the first message includes that a binding relationship exists between the content or the format of the second message and the first message, and the content or the format of the second message is determined by the network side device based on the first message and the binding relationship.

In some embodiments, the second message includes vehicle driving-related information of a plurality of content types, and that the network side device determines a second message including the vehicle driving-related information includes the following step.

The network side device determines a transmission priority of vehicle driving-related information of each of the plurality of content types based on the first message.

In some embodiments, vehicle driving-related information of a content type with a higher transmission priority is transmitted in terms of a transmission time sequence, or has a higher level of detail in terms of content or a format.

In some embodiments, the first message includes a time period or a road section in which the vehicle to which the vehicle-side device belongs is driving, and that the network side device determines a transmission priority of vehicle driving-related information of each of the plurality of content types based on the first message includes that the network side device determines the transmission priority of the vehicle driving-related information of each content type based on the time period or the road section.

According to another aspect of embodiments of this disclosure, an embodiment of this disclosure further provides a vehicle-side device. The vehicle-side device includes a first sending unit configured to send, to a network side device, a first message used to obtain vehicle driving-related information, and a first receiving unit configured to receive, from the network side device, a second message including the vehicle driving-related information, where content or a format of the second message is determined by the network side device based on the first message.

In some embodiments, the first message includes vehicle driving-related information reported or requested by the vehicle-side device to the network side device.

In some embodiments, the reported vehicle driving-related information includes at least one of an autonomous driving level of a vehicle to which the vehicle-side device belongs, a lane on which the vehicle to which the vehicle-side device belongs is located, or a current vehicle speed of the vehicle to which the vehicle-side device belongs.

In some embodiments, the requested vehicle driving-related information includes a content type or a level of detail of the vehicle driving-related information.

In some embodiments, the first message carries the content type or the level of detail based on a predefined bit coding scheme.

In some embodiments, that content or a format of the second message is determined by the network side device based on the first message includes that the content of the second message is determined by the network side device as a road condition description or a driving operation instruction based on the first message, or the format of the second message is determined by the network side device as a human recognizable language or a machine recognizable language based on the first message.

In some embodiments, that content or a format of the second message is determined by the network side device based on the first message includes that a binding relationship exists between the content or the format of the second message and the first message, and the content or the format of the second message is determined by the network side device based on the first message and the binding relationship.

In some embodiments, the second message includes vehicle driving-related information of a plurality of content types, and the first message is further used by the network side device to determine a transmission priority of vehicle driving-related information of each of the plurality of content types.

In some embodiments, vehicle driving-related information of a content type with a higher transmission priority is transmitted in terms of a transmission time sequence, or has a higher level of detail in terms of content or a format.

In some embodiments, the first message includes a time period or a road section in which the vehicle to which the vehicle-side device belongs is driving, and that the network side device determines a transmission priority of vehicle driving-related information of each of the plurality of content types includes that the network side device determines the transmission priority of the vehicle driving-related information of each content type based on the time period or the road section.

According to another aspect of embodiments of this disclosure, an embodiment of this disclosure further provides a network side device. The device includes a second receiving unit configured to receive a first message that is sent by a vehicle-side device and that is used to obtain vehicle driving-related information, a determining unit configured to determine a second message including the vehicle driving-related information, where content or a format of the second message is determined by the determining unit based on the first message, and a second sending unit configured to send the second message to the vehicle-side device.

In some embodiments, the first message includes vehicle driving-related information reported or requested by the vehicle-side device to the network side device.

In some embodiments, the reported vehicle driving-related information includes at least one of an autonomous driving level of a vehicle to which the vehicle-side device belongs, a lane on which the vehicle to which the vehicle-side device belongs is located, or a current vehicle speed of the vehicle to which the vehicle-side device belongs, and the determining unit is configured to determine the content or the format of the second message based on the at least one of the autonomous driving level of the vehicle to which the vehicle-side device belongs, the lane on which the vehicle to which the vehicle-side device belongs is located, or the current vehicle speed of the vehicle to which the vehicle-side device belongs.

In some embodiments, the requested vehicle driving-related information includes a content type or a level of detail of the vehicle driving-related information, and the determining unit is configured to determine the content or the format of the second message based on the content type or the level of detail.

In some embodiments, the first message carries the content type or the level of detail based on a predefined bit coding scheme, and the determining unit is configured to determine the content type or the level of detail based on the first message and the predefined bit coding scheme, and determine the content or the format of the second message based on the content type or the level of detail.

In some embodiments, that content or a format of the second message is determined by the determining unit based on the first message includes that the content of the second message is determined by the determining unit as a road condition description or a driving operation instruction based on the first message, or the format of the second message is determined by the determining unit as a human recognizable language or a machine recognizable language based on the first message.

In some embodiments, that content or a format of the second message is determined by the determining unit based on the first message includes that a binding relationship exists between the content or the format of the second message and the first message, and the content or the format of the second message is determined by the determining unit based on the first message and the binding relationship.

In some embodiments, the second message includes vehicle driving-related information of a plurality of content types, and the determining unit is configured to determine a transmission priority of vehicle driving-related information of each of the plurality of content types based on the first message.

In some embodiments, vehicle driving-related information of a content type with a higher transmission priority is transmitted in terms of a transmission time sequence, or has a higher level of detail in terms of content or a format.

In some embodiments, the first message includes a time period or a road section in which the vehicle to which the vehicle-side device belongs is driving, and the determining unit is configured to determine the transmission priority of the vehicle driving-related information of each content type based on the time period or the road section.

According to another aspect of embodiments of this disclosure, an embodiment of this disclosure further provides a vehicle-side device. The vehicle-side device includes a memory and a processor. The memory stores computer program instructions, and the processor runs the computer program instructions to perform the method according to any one of the foregoing embodiments.

According to another aspect of embodiments of this disclosure, an embodiment of this disclosure further provides a network side device. The vehicle-side device includes a memory and a processor. The memory stores computer program instructions, and the processor runs the computer program instructions to perform the method according to any one of the foregoing embodiments.

According to another aspect of embodiments of this disclosure, an embodiment of this disclosure further provides a vehicle. The vehicle includes the vehicle-side device according to any one of the foregoing embodiments.

According to another aspect of embodiments of this disclosure, an embodiment of this disclosure further provides an internet of vehicles system. The system includes the vehicle-side device according to the foregoing embodiments, and the network side device according to the foregoing embodiments.

In some embodiments, the network side device includes a cloud server and a road side unit.

According to another aspect of embodiments of this disclosure, an embodiment of this disclosure further provides a computer storage medium. The computer storage medium stores computer instructions, and when the computer instructions are run on a processor, a vehicle-side device is enabled to perform the method according to the foregoing embodiments.

According to another aspect of embodiments of this disclosure, an embodiment of this disclosure further provides a computer storage medium. The computer storage medium stores computer instructions, and when the computer instructions are run on a processor, a network side device is enabled to perform the method according to the foregoing embodiments.

According to another aspect of embodiments of this disclosure, an embodiment of this disclosure further provides a computer program product. When the computer program product runs on a processor, a vehicle-side device is enabled to perform the method according to any one of the foregoing embodiments.

According to another aspect of embodiments of this disclosure, an embodiment of this disclosure further provides a computer program product. When the computer program product runs on a processor, a network side device is enabled to perform the method according to any one of the foregoing embodiments.

BRIEF DESCRIPTION OF DRAWINGS

To describe technical solutions in embodiments of the present application, the following briefly introduces accompanying drawings for describing embodiments. It is clear that the accompanying drawings in the following descriptions show some embodiments of the present application, and a person of ordinary skill in the art may still derive other drawings from these accompanying drawings without creative efforts.

8

Figure 4:
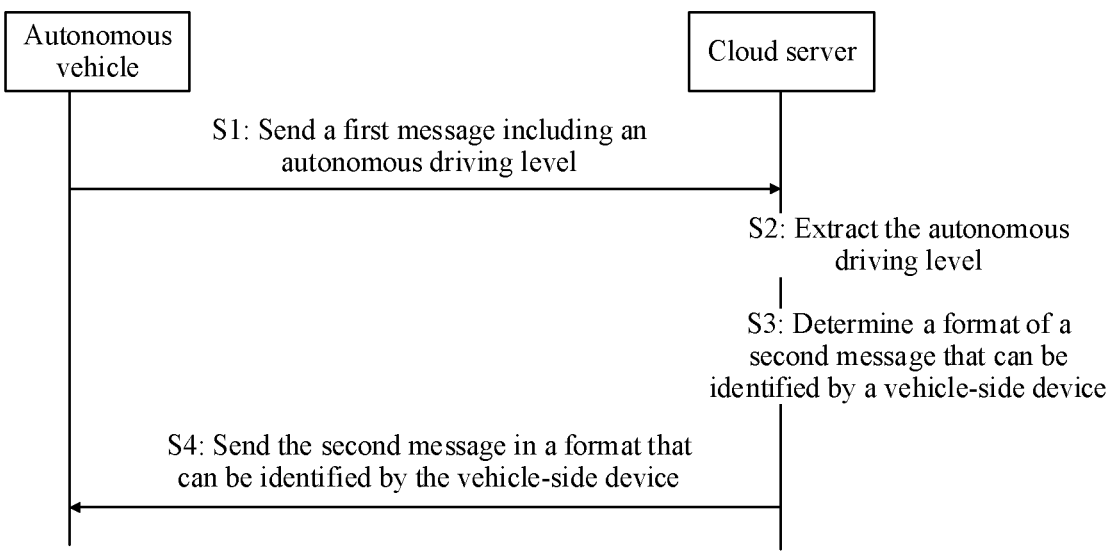
Figure 5:
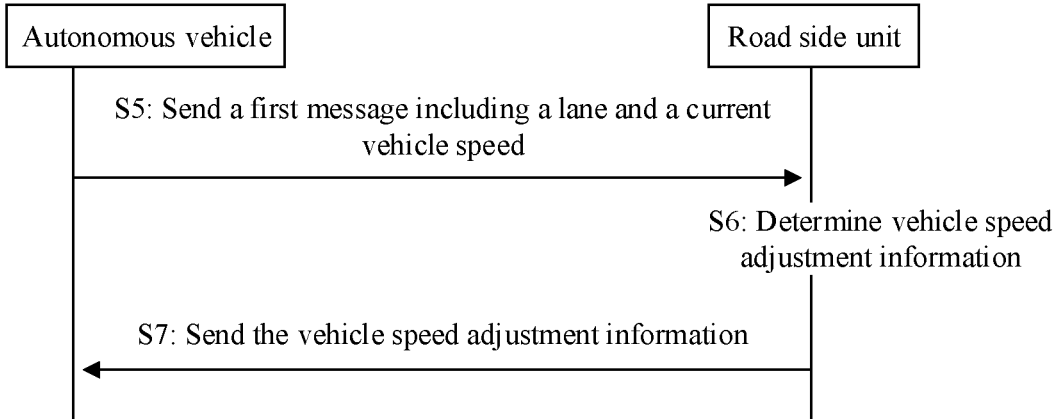
Figure 6:
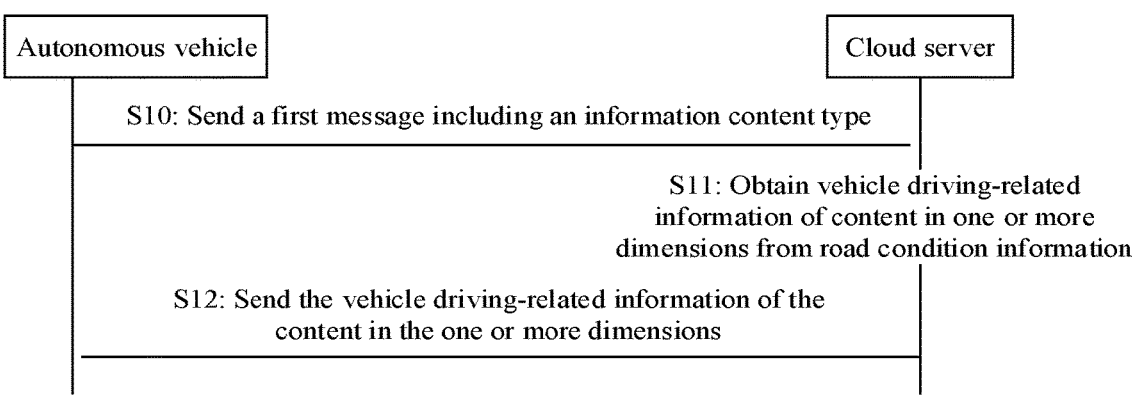
Figure 7:
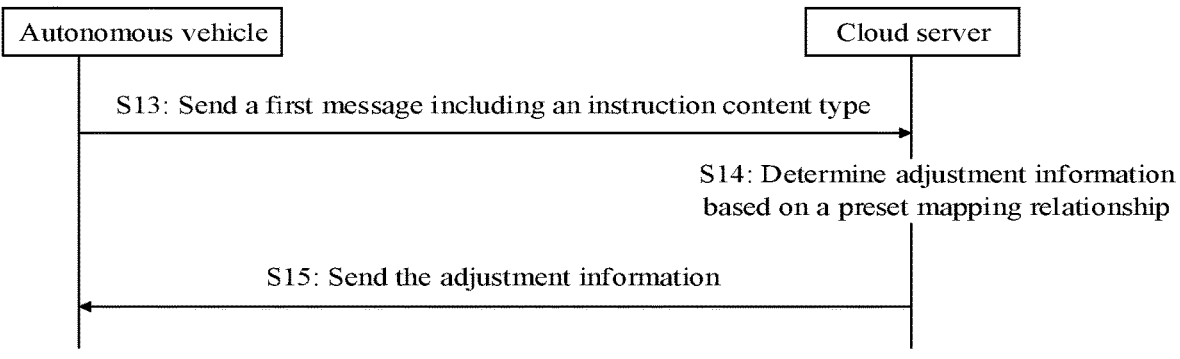
Figure 8:
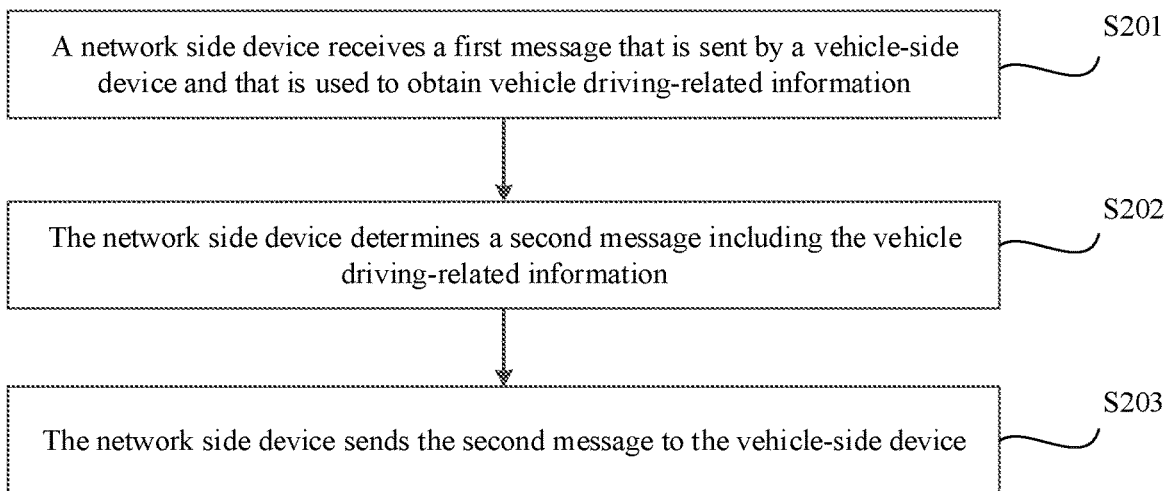
Figure 9:
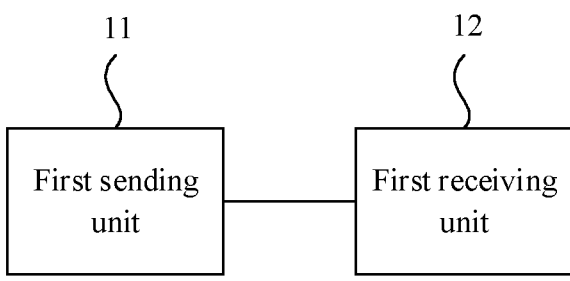
Figure 10:
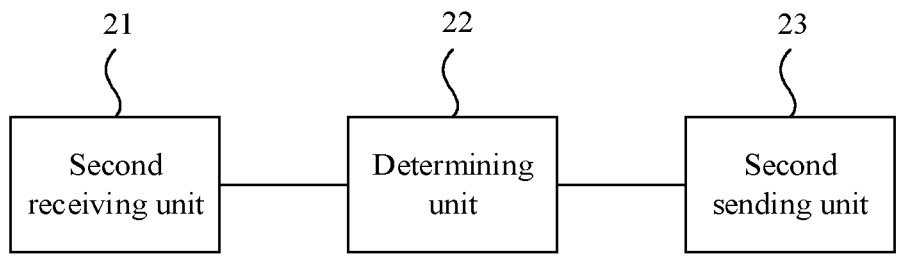
Figure 11:
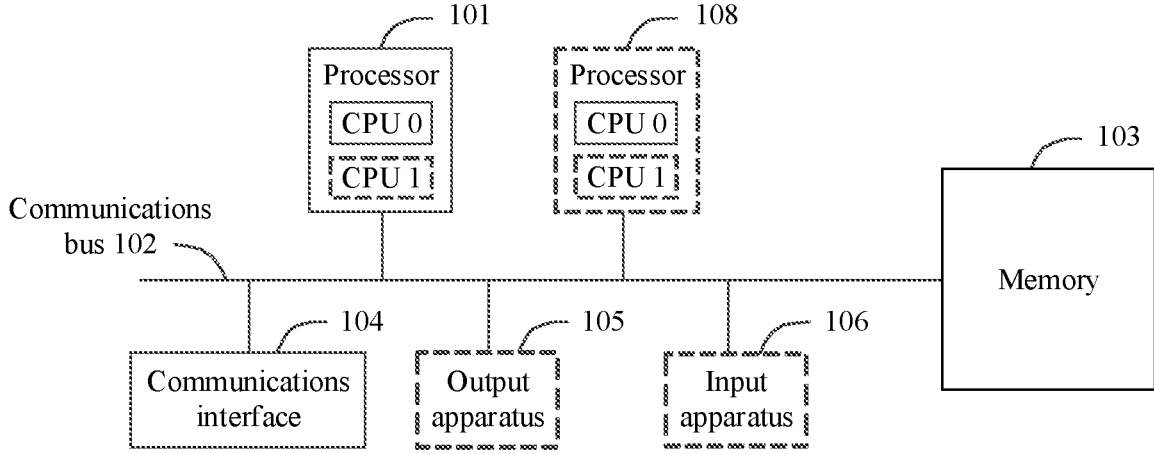
Figure 12:
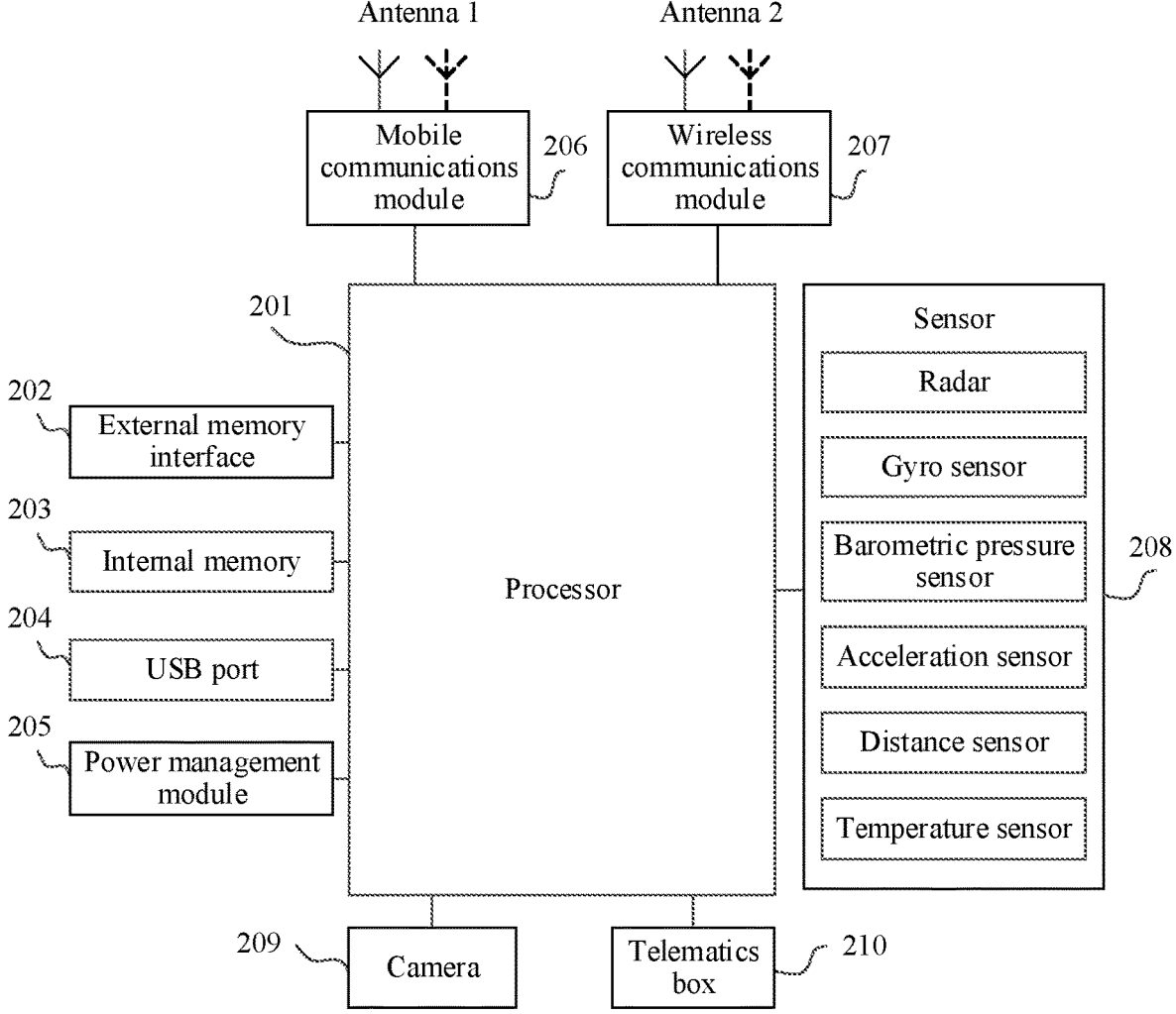

FIG. 4 is a flowchart of a data transmission method between a vehicle-side device and a cloud server according to Embodiment 2 of this disclosure;

FIG. 5 is a flowchart of a data transmission method between a vehicle-side device and a road side unit according to Embodiment 3 of this disclosure;

FIG. 6 is a flowchart of a data transmission method between a vehicle-side device and a cloud server according to Embodiment 4 of this disclosure;

FIG. 7 is a flowchart of a data transmission method between a vehicle-side device and a cloud server according to Embodiment 5 of this disclosure;

FIG. 8 is a flowchart of a data transmission method according to Embodiment 6 of this disclosure;

FIG. 9 is a block diagram of a structure of a vehicle-side device according to Embodiment 7 of this disclosure;

FIG. 10 is a block diagram of a structure of a network side device according to Embodiment 8 of this disclosure;

FIG. 11 is a block diagram of a structure of a vehicle-side device or a network side device according to Embodiment 9 of this disclosure; and FIG. 12 is a schematic diagram of internal components of a vehicle according to Embodiment 10 of this disclosure.

DESCRIPTION OF EMBODIMENTS

Example embodiments are described herein, and examples of the example embodiments are presented in accompanying drawings. When the following description relates to the accompanying drawings, unless specified otherwise, same numbers in different accompanying drawings represent a same or similar element. Implementations described in the following example embodiments do not represent all implementations consistent with this disclosure. On the contrary, they are only examples of apparatuses and methods that are described in the appended claims in detail and that are consistent with some aspects of this disclosure.

The following describes, by using embodiments, technical solutions of this disclosure and how the foregoing technical problems are resolved by using the technical solutions of this application. The following several embodiments may be combined with each other, and a same or similar concept or process may not be described repeatedly in some embodiments. The following describes embodiments of this disclosure with reference to the accompanying drawings.

Figure 1:
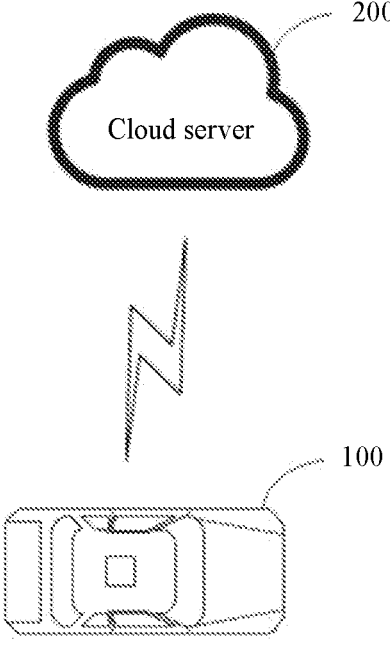
FIG. 1 is a schematic diagram of a typical application scenario according to an embodiment of this disclosure.
Figure 2:
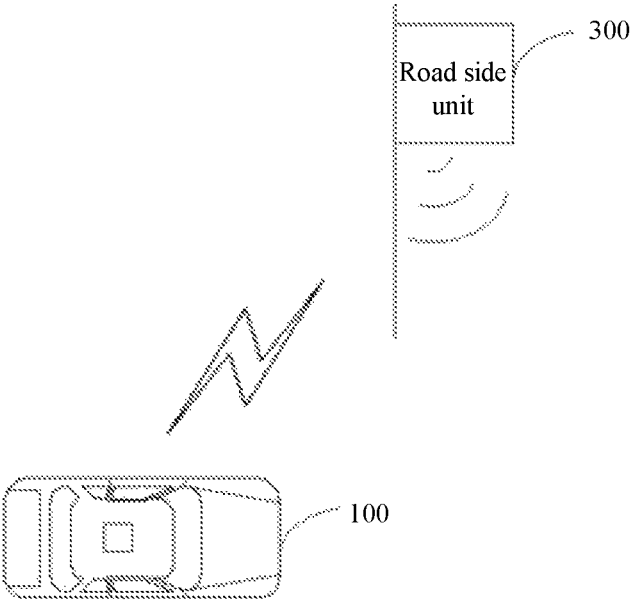
FIG. 2 is a schematic diagram of another typical application scenario according to an embodiment of this disclosure.

A data transmission method in embodiments of this disclosure is applicable to application scenarios shown in FIG. 1 and FIG. 2.

In the application scenario shown in FIG. 1, a vehicle 100 includes a vehicle-side device (not shown in FIG. 1). The vehicle-side device may be a telematics box (T-Box), a domain controller (DC), a multi-DC (MDC), an on-board unit (OBU), an internet of vehicles chip, or the like disposed in the vehicle 100.

The vehicle-side device establishes a communication link with a cloud server 200 (one of network side devices).

The vehicle-side device may be connected to the cloud server by using a corresponding account and password, or the vehicle-side device may be connected to the cloud server by using a unique identification code of the vehicle-side device (for example, a device identification code of the vehicle-side device and a license plate number of the vehicle), to implement data exchange between the vehicle-side device and the cloud server (for example, data transmission between the vehicle-side device and the network side device in embodiments of this disclosure).

In the application scenario shown in FIG. 2, the vehicle 100 includes a vehicle-side device (not shown in FIG. 2). The vehicle-side device may be a T-Box, a DC, an MDC, an OBU, an internet of vehicles chip, or the like disposed in the vehicle 100.

The vehicle-side device establishes a communication link with a road side unit (RSU) 300 (one of network side devices).

Similarly, the vehicle-side device may be connected to the road side unit by using a corresponding account and password, or the vehicle-side device may be connected to the road side unit by using a unique identification code of the vehicle-side device (for example, a device identification code of the vehicle-side device and a license plate number of the vehicle), to implement data exchange between the vehicle-side device and the road side unit (for example, data transmission between the vehicle-side device and the network side device in embodiments of this disclosure).

The following describes, in detail by using embodiments, technical solutions of this disclosure and how the foregoing technical problems are resolved by using the technical solutions of this application. The following several embodiments may be combined with each other, and a same or similar concept or process may not be described repeatedly in some embodiments. The following describes embodiments of this disclosure with reference to the accompanying drawings.

According to one aspect, an embodiment of this disclosure provides a data transmission method.

Figure 3:
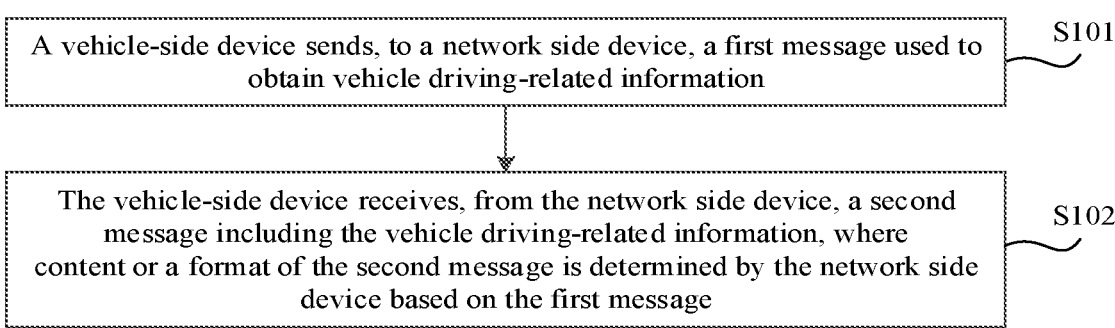
FIG. 3 is a flowchart of a data transmission method according to Embodiment 1 of this disclosure.

FIG. 3 is a schematic flowchart of a data transmission method according to an embodiment of this disclosure.

As shown in FIG. 3, the method includes the following steps.

S101: A vehicle-side device sends, to a network side device, a first message used to obtain vehicle driving-related information.

The first message is used to represent an information requirement of the vehicle-side device. That is, the vehicle-side device may obtain the vehicle driving-related information from the network side device based on the information requirement.

The vehicle driving-related information is information related to driving of a vehicle, and includes a vehicle speed, a location, a lane, a location between the vehicle and another vehicle, and the like.

The first message includes vehicle driving-related information reported or requested by the vehicle-side device to the network side device.

In an example, in some embodiments, when the vehicle-side device has an information requirement, the vehicle-side device may obtain, from the network side device by reporting the vehicle driving-related information, a second message corresponding to the information requirement, where the second message is determined by the network side device from collected road condition information based on the information requirement.

In some other embodiments, when the vehicle-side device has an information requirement, the vehicle-side device may further obtain, from the network side device by requesting the vehicle driving-related information, a second message corresponding to the information requirement. In this case, the information requirement of the vehicle-side device is the requested vehicle driving-related information. Similarly, the second message is determined by the network side device from collected road condition information based on the information requirement.

S102: The vehicle-side device receives, from the network side device, the second message including the vehicle driving-related information, where content or a format of the second message is determined by the network side device based on the first message.

That is, the second message may be understood from two aspects. One aspect is the content of the second message, and the other aspect is the format of the second message. Different first messages may correspond to different content and/or formats of second messages.

After receiving the first message sent by the vehicle-side device, the network side device determines the second message from the road condition information based on the first message. The second message includes the vehicle driving-related information, and the second message may be reflected in the two aspects: the content and the format, that is, the second message may include content and a format of the vehicle driving-related information.

In other words, after receiving the first message sent by the vehicle-side device, the network side device may determine an information requirement of the vehicle-side device based on the first message, select vehicle driving-related information corresponding to the information requirement from the road condition information, and send, to the vehicle-side device, the second message including the vehicle driving-related information corresponding to the information requirement.

The road condition information is used to represent information related to driving of a vehicle, and the road condition information may be described from three aspects. A first aspect is the vehicle, a second aspect is a road, and a third aspect is an environment.

In an example, the road condition information of the vehicle includes driving information (including a speed, a lane, and the like) of the vehicle, congestion information, passable information, safety information, and the like. The road condition information of the road includes information that a lane on the road is occupied by a pedestrian and a motor vehicle, information that a pedestrian/bicycle crosses the road, and the like. The road condition information of the environment includes weather information, such as raining, snowing, or heavy fog.

The road condition information may include road condition information collected by the network side device by using a sensor, and may further include road condition information that is sent by another vehicle or terminal and that is received in a wired or wireless manner.

In this embodiment of this disclosure, the vehicle-side device sends, to the network side device, the first message used to obtain the vehicle driving-related information, so that the vehicle-side device can actively and selectively obtain the vehicle driving-related information from the network side device, to improve intelligence of interaction between the vehicle-side device and the network side device. In addition, because the vehicle-side device can selectively obtain the vehicle driving-related information from the network side device, a problem that data obtained by the vehicle-side device in the conventional technology is redundant can be avoided, and a problem that there is a long delay when the vehicle-side device obtains all data in the conventional technology can be further avoided, to achieve a technical effect of improving information transmission efficiency.

The data transmission method in embodiments of this disclosure is now described below with reference to the application scenario shown in FIG. 1.

The vehicle-side device may send, to the cloud server through the communication link, the first message used to obtain the vehicle driving-related information.

For example, if the vehicle driving-related information is congestion information, the cloud server selects the congestion information from the road condition information, and sends the selected congestion information to the vehicle-side device. If the vehicle driving-related information is information that a lane on the road is occupied by a pedestrian and a motor vehicle, the cloud server selects, from the road condition information, the information that the lane on the road is occupied by the pedestrian and the motor vehicle, and sends, to the vehicle-side device, the selected information that the lane on the road is occupied by the pedestrian and the motor vehicle, and the like. Details are not described herein.

In some embodiments, the content of the second message is determined by the network side device as a road condition description or a driving operation instruction based on the first message.

Alternatively, the format of the second message is determined by the network side device as a human recognizable language or a machine recognizable language based on the first message.

A format of the human recognizable language is a format of raw data on which format processing is not performed.

For example, lane-level congestion information is information about traffic congestion caused by a large quantity of vehicles on a lane, traffic disorder, narrowness of the lane, or the like, including information such as a degree of congestion. Passable information is information about whether a vehicle on a road can pass, that is, a passable status of a road at a specific time point. A traffic condition is descriptions of a speed and traffic of a vehicle on a road. Information that a pedestrian, a bicycle, and the like cross a road is descriptions of pedestrian traffic on a pedestrian crosswalk and bicycle traffic on a bicycle lane, and the like.

A format of the machine recognizable language is a format of a machine recognizable instruction type that is generated by processing the format of the raw data.

For example, an instruction is used to instruct a vehicle to change a lane, change a speed, brake, or the like.

It can be learned from the foregoing examples that the first message may include the vehicle driving-related information reported by the vehicle-side device to the network side device.

In some embodiments, the reported vehicle driving-related information includes at least one of an autonomous driving level of the vehicle, a lane on which the vehicle is located, or a current vehicle speed of the vehicle.

The data transmission method in embodiments of this disclosure is now described in detail with reference to FIG. 1 and FIG. 4 by using an example in which the reported vehicle driving-related information includes the autonomous driving level. FIG. 4 is a schematic diagram of interaction between the vehicle-side device and the cloud server based on FIG. 1.

S1: The vehicle-side device sends, to the cloud server, a first message used to obtain vehicle driving-related information, where the first message includes an autonomous driving level.

The autonomous driving level may include six levels: L0 to L5.

In an example, L0 indicates manual driving, that is, a driver is fully responsible for driving. L1 indicates driver assistance, that is, a vehicle provides one of the following driving operations: steering and acceleration and deceleration, and a driver is responsible for remaining driving operations. L2 indicates partial driving automation, that is, a vehicle provides a plurality of the following driving operations: steering and acceleration and deceleration, and a driver is responsible for remaining driving operations. L3 indicates conditional driving automation, that is, a vehicle completes most driving operations, and a driver keeps attention focused in case of emergency. L4 indicates high driving automation, that is, a vehicle completes all driving operations, and a driver does not need to keep attention, in a case other than a limited road and a limited environment condition. L5 indicates full driving automation, that is, a vehicle completes all driving operations, and a driver does not need to keep attention.

S2: The cloud server extracts the autonomous driving level from the first message.

S3: The cloud server determines, based on the autonomous driving level, a format of a second message that can be identified by the vehicle-side device.

It can be learned from the foregoing examples that the format of the second message may include a human recognizable language or a machine recognizable language, and the format of the second message that can be identified by the vehicle-side device may be determined based on a corresponding autonomous driving level. Therefore, the network side device may determine the format of the second message based on the autonomous driving level corresponding to the vehicle-side device.

S4: The cloud server sends the second message to the vehicle-side device in a format that can be identified by the vehicle-side device.

For example, if vehicle-side devices corresponding to an autonomous driving level L3 and a level lower than L3 cannot identify a machine recognizable language, but can identify a human recognizable language, a format of the second message sent by the network side device to the vehicle-side device is the human recognizable language.

In this embodiment of this disclosure, the network side device may determine, based on the autonomous driving level, the format that can be identified by the vehicle-side device, generates the second message in the format that can be identified by the vehicle-side device, and sends the second message to the vehicle-side device, so that the vehicle-side device can identify the second message, to improve data transmission effectiveness, and reduce data transmission costs.

It should be noted that the foregoing interaction method may also be implemented by the vehicle-side device and the road side unit. An implementation principle thereof is the same as an implementation principle of the foregoing interaction method. Details are not described herein again.

It can be learned from the foregoing examples that the reported vehicle driving-related information may include the lane on which the vehicle to which the vehicle-side device belongs is located, and may further include the current vehicle speed of the vehicle to which the vehicle-side device belongs.

In an example, the vehicle-side device may send, to the cloud server, the vehicle driving-related information including the lane on which the vehicle to which the vehicle-side device belongs is located and the current vehicle speed of the vehicle to which the vehicle-side device belongs, and the cloud server determines, from road condition information, related information for adjusting current driving of the vehicle, where the related information for adjusting current driving of the vehicle includes lane adjustment information and/or vehicle speed adjustment information. The cloud server sends the related information for adjusting current driving of the vehicle (that is, the vehicle driving-related information) to the vehicle-side device, so that the vehicle-side device controls, based on the related information for adjusting current driving of the vehicle, driving of the vehicle to which the vehicle-side device belongs, to implement safe and reliable driving of the vehicle.

The data transmission method in embodiments of this disclosure is now described in detail with reference to FIG. 2 and FIG. 5 by using an example in which the first message includes the lane and the current vehicle speed. FIG. 5 is a schematic diagram of interaction between the vehicle-side device and the road side unit based on FIG. 2.

Details can be known with reference to FIG. 2 and FIG. 5.

S5: The vehicle-side device sends, to the road side unit, a first message used to obtain vehicle driving-related information, where the first message includes a lane and a current vehicle speed.

The lane is used to represent a lane on which a vehicle to which the vehicle-side device belongs travels, for example, a left lane, a middle lane, or a right lane. The current vehicle speed is used to represent a current driving speed of the vehicle to which the vehicle-side device belongs, for example, XX kilometers/hour.

S6: The road side unit may determine, based on road condition information, a speed of the vehicle to which the vehicle-side device belongs under the condition of safe driving, and determines vehicle speed adjustment information used to adjust the current vehicle speed.

S7: The road side unit sends the vehicle speed adjustment information (that is, one type of information in the vehicle driving-related information) to the vehicle-side device.

For example, the road side unit can learn, based on the road condition information, that a vehicle in front of the vehicle to which the vehicle-side device belongs decelerates. To ensure that a safe distance is maintained between the vehicle to which the vehicle-side device belongs and the vehicle in front of the vehicle, the vehicle to which the vehicle-side device belongs also needs to decelerate correspondingly, to avoid a collision with the vehicle in front of the vehicle. In addition, the road side unit can learn, based on the road condition information, of a vehicle speed obtained after deceleration of the vehicle in front of the vehicle, generates a speed used to indicate the vehicle to which the vehicle-side device belongs to decelerate by at least a value the same as the vehicle speed obtained after the deceleration, where the speed is the vehicle speed adjustment information, and sends the vehicle speed adjustment information to the vehicle-side device, so that the vehicle-side device adaptively adjusts a current vehicle speed based on the vehicle speed adjustment information, to implement safe driving of the vehicle to which the vehicle-side device belongs.

In some embodiments, a binding relationship exists between content or a format of a second message and the first message, and the content or the format of the second message is determined by the network side device based on the first message and the binding relationship.

In some embodiments, a format of the vehicle speed adjustment information may be determined based on an adjustment direction and differential quantization.

The adjustment direction is used to represent a speed adjustment dynamic, that is, a speed adjustment direction, for example, acceleration, deceleration, or a constant speed. The differential quantization is used to represent a speed adjustment amount, for example, XX kilometers/hour.

For example, the format of the vehicle speed adjustment information is represented by acceleration by 20 kilometers/hour, deceleration by 30 kilometers/hour, or a constant speed by 30 kilometers/hour.

S8: The road side unit determines, based on the collected road condition information, a lane of the vehicle to which the vehicle-side device belongs under the condition of safe driving, to determine lane adjustment information used to adjust the lane of the vehicle to which the vehicle-side device belongs.

S9: The road side unit sends the lane adjustment information to the vehicle-side device.

For example, the road side unit can learn, based on the road condition information, whether the lane on which the vehicle to which the vehicle-side device belongs travels is in a congested state, or whether a traffic accident occurs. Alternatively, the road side unit may determine, based on a driving route of the vehicle to which the vehicle-side device belongs and that is synchronized to the road side unit and the road condition information, whether the vehicle to which the vehicle-side device belongs needs to change a lane, and the like. Therefore, to ensure safe driving of the vehicle to which the vehicle-side device belongs and avoid a time loss caused by congestion or the like, the road side unit may determine the lane adjustment information based on the road condition information.

For example, the road side unit can learn, based on the road condition information, that a traffic accident occurs in front of a lane on which the vehicle to which the vehicle-side device belongs travels. In this case, the road side unit generates information (that is, the lane adjustment information) used to indicate the vehicle to which the vehicle-side device belongs to change a lane from a current lane to a left lane, and sends the lane adjustment information to the vehicle-side device, so that the vehicle-side device adaptively adjusts the lane based on the lane adjustment information.

In some embodiments, a format of the lane adjustment information is determined based on a preset code.

For example, a code 00 represents no change to a lane, a code 01 represents changing a lane to a lane 1, a code 10 represents changing a lane to a lane 2, and a code 11 represents changing a lane to a lane 3.

With reference to the foregoing examples, the road side unit may integrate the vehicle speed adjustment information and the lane adjustment information to obtain one piece of adjustment information that includes the vehicle speed adjustment information and the lane adjustment information, and may send the adjustment information to the vehicle-side device based on the foregoing format, for example, 00+ acceleration by 20 kilometers/hour.

It should be noted that there is no limitation on a sequence of a combination of S6 and S7 and a combination of S8 and S9. That is, S6 and S7 may be performed before or after S8 and S9, or S6 and S7 and S8 and S9 may be simultaneously performed.

In some embodiments, the requested vehicle driving-related information includes a content type or a level of detail of the vehicle driving-related information.

The content type of the vehicle driving-related information is used to represent content in different dimensions of the vehicle driving-related information. There may be two content types: an information content type and an instruction content type.

In some embodiments, the information content type may include lane congestion information, lane accident information, lane road condition information, lane passable information, weather information, information that a pedestrian and/or a bicycle cross/crosses a road, information that a lane is occupied by a pedestrian and/or a motor vehicle, and the like.

In some embodiments, the instruction content type may include a speed change request, a lane change request, a braking request, a bypass request, and the like.

The data transmission method in embodiments of this disclosure is now described in detail with reference to FIG. 1 and FIG. 6 by using an example in which the content type includes the information content type. FIG. 6 is a schematic diagram of interaction between the vehicle-side device and the cloud server based on FIG. 1.

Details can be known with reference to FIG. 1 and FIG. 6.

S10: The vehicle-side device sends a first message to the cloud server, where the first message includes a content type of vehicle driving-related information, and the content type is, for example, an information content type.

In an example, the vehicle-side device may send the first message to the cloud server based on vehicle driving-related information of content that is in one or more dimensions and on which the vehicle-side device focuses, to obtain, from the cloud server, the vehicle driving-related information of the content that is in the one or more dimensions and on which the vehicle-side device focuses. Therefore, the vehicle-side device can actively select, based on a requirement, the corresponding vehicle driving-related information of the content in the one or more dimensions, to improve intelligence. In addition, compared with transmission of vehicle driving-related information of content in all dimensions, targeted transmission of the vehicle driving-related information of the content in the one or more dimensions reduces transmission costs and improves a transmission effect.

S11: The cloud server obtains the vehicle driving-related information of the content in the one or more dimensions from road condition information.

For example, if the information content type is lane congestion information, that is, the vehicle-side device focuses on whether a lane is congested, the cloud server obtains vehicle driving-related information corresponding to the lane congestion information from the road condition information.

S12: The cloud server transmits the obtained vehicle driving-related information of the content in the one or more dimensions to the vehicle-side device.

The vehicle-side device may adjust, based on the obtained vehicle driving-related information of the content in the one or more dimensions, a driving status of a vehicle to which the vehicle-side device belongs.

For example, the vehicle-side device can learn, based on the vehicle driving-related information of the content in the one or more dimensions, that a lane is in a congested state. In this case, the vehicle-side device may adjust a lane of the vehicle to which the vehicle-side device belongs, re-plan a route, or the like, to avoid a congested road condition, save time, and improve efficiency.

In some embodiments, the first message carries a content type or a level of detail based on a predefined bit coding scheme.

For example, there are a total of eight information content types, the lane congestion information may be mapped to a first bit in the eight bits, and the first message sent by the vehicle-side device to the cloud server (or the road side unit) is "10000000". Similarly, a lane accident information may be mapped to a second bit in the eight bits, and the first message sent by the vehicle-side device to the cloud server (or the road side unit) is "01000000". Certainly, if the content type includes the lane congestion information and the lane accident information, the first message sent by the vehicle-side device to the cloud server (or the road side unit) is "11000000". By analogy, details are not described herein.

It can be learned from the foregoing examples that the instruction content type may include a speed change request, a lane change request, a braking request, a bypass request, and the like.

The data transmission method in embodiments of this disclosure is now described in detail with reference to FIG. 1 and FIG. 7 by using an example in which the content type includes the instruction content type. FIG. 7 is a schematic diagram of interaction between the vehicle-side device and the cloud server based on FIG. 1.

Details can be known with reference to FIG. 1 and FIG. 7.

S13: The vehicle-side device sends a first message to the cloud server, where the first message includes requested vehicle driving-related information, and the requested vehicle driving-related information includes an instruction content type.

For example, if the instruction content type in the first message sent by the vehicle-side device includes a speed change request, it means that the vehicle-side device expects to obtain, from the cloud server, speed change information corresponding to the speed change request.

In some embodiments, the vehicle-side device may define the instruction content type based on a bit coding scheme, and interact with the cloud server. For example, the speed change request is 00, and a braking request is 01.

S14: The cloud server obtains an adjustment result (that is, adjustment information) from a preset mapping relationship based on road condition information and the instruction content type.

For example, if the instruction content type is the speed change request, and the cloud server determines, based on the road condition information, that there is road condition information that a pedestrian, a bicycle, and the like cross a road, determines, based on the road condition information, that road congestion occurs, determines, based on the road condition information, that road construction is carried out, or the like, the cloud server generates deceleration information, and determines the deceleration information as the adjustment result, that is, determines the adjustment information as deceleration. If the cloud server determines, based on the dynamic information, that the road is unblocked, the cloud server may generate acceleration information, and determines the acceleration information as the adjustment result, that is, determines the adjustment information as acceleration. Therefore, the vehicle-side device adjusts a current running status based on the adjustment information used to indicate deceleration or acceleration, to ensure pedestrian safety and safe driving.

For another example, in some other embodiments, if the instruction content type is the lane change request, and the cloud server determines, based on the road condition information, that there is road condition information that a pedestrian, a bicycle, and the like cross a road, determines, based on the road condition information, that road congestion occurs, determines, based on the road condition information, that road construction is carried out, an accident occurs on a lane, or a lane is occupied by a pedestrian and/or a motor vehicle, or the like, the cloud server generates lane change information, and determines the lane change information as the adjustment result, that is, determines the adjustment information as a lane change. Therefore, the vehicle adjusts a current running status based on the adjustment information used to indicate the lane change, to ensure pedestrian safety and safe driving.

S15: The cloud server sends the adjustment information to the vehicle-side device, so that the vehicle-side device adjusts, based on the adjustment information, a current running status of the vehicle to which the vehicle-side device belongs.

It should be noted that in some embodiments, after receiving a request from the vehicle-side device, the cloud server may obtain the road condition information based on an identifier carried by the vehicle-side device, that is, track and position, based on the identifier, the vehicle to which the vehicle-side device belongs, to obtain the vehicle driving-related information corresponding to the vehicle to which the vehicle-side device belongs, and generate and request a second message based on the obtained vehicle driving-related information.

It can be learned from the foregoing examples that the requested vehicle driving-related information may further include a level of detail.

The level of detail is used to represent a content richness level of the vehicle driving-related information, for example, brevity, generalness, and richness.

For example, if richness is a first level, generalness is a second level, and brevity is a third level, vehicle driving-related information corresponding to the first level may be "an accident occurs on an $X^{th}$ lane at an intersection of XX road and a typical point", vehicle driving-related information corresponding to the second level may be "an accident occurs at an intersection of XX road and a typical point", and vehicle driving-related information corresponding to the third level may be "an accident occurs on XX road".

In some embodiments, the second message includes vehicle driving-related information of a plurality of content types, the first message is further used by the network side device to determine a transmission priority of vehicle driving-related information of each of the plurality of content types, and that content and a format of the second message is determined by the network side device based on the first message includes that content or a format of the vehicle driving-related information of each content type in the second message is determined by the network side device based on the transmission priority.

In some embodiments, vehicle driving-related information of a content type with a higher transmission priority is transmitted in terms of a transmission time sequence, or has a higher level of detail in terms of content or a format.

The transmission priority is used to represent a transmission level of vehicle driving-related information of each content type, for example, a first priority, a second priority, and a third priority. Different priorities correspond to different transmission sequences. For example, vehicle driving-related information that is of a content type and that corresponds to the first priority is transmitted first, and by analogy. Details are not described herein.

In some embodiments, the vehicle-side device may preset a transmission priority based on a requirement, and transmits the transmission priority to the cloud server (or the road side unit), so that the cloud server (or the road side unit)

stores the transmission priority, determines a transmission sequence of the vehicle driving-related information based on information about the transmission priority, and transmits the driving-related information based on the transmission sequence.

Certainly, in some other embodiments, the vehicle-side device may set a current transmission priority based on a requirement.

That is, the transmission priority may be preset, or may be set in real time. If the transmission priority is preset, the vehicle-side device may adaptively adjust the transmission priority based on a preset time interval or a requirement.

For example, if the transmission priority includes that a lane accident priority is higher than a lane congestion priority, after determining lane accident information and lane congestion information from the road condition information, the cloud server (or the road side unit) transmits the lane accident information to the vehicle-side device, and then transmits the lane congestion information to the vehicle-side device.

In some embodiments, the first message includes a time period or a road section in which the vehicle to which the vehicle-side device belongs is driving, and that the network side device determines a transmission priority of vehicle driving-related information of each of the plurality of content types includes that the network side device determines the transmission priority of the vehicle driving-related information of each of the plurality of content types based on the time period or the road section.

In other words, in some embodiments, the vehicle-side device may set transmission priorities for different time periods or different road sections based on historical driving records and historical road condition information of road sections.

For example, it can be learned based on a historical driving record and historical road condition information of a road section A that the road section A is a road section in which accidents occur frequently. In this case, when the vehicle to which the vehicle-side device belongs travels in the road section A, lane accident information may be set to a highest priority, that is, the vehicle-side device may obtain the lane accident information of the road section A.

For another example, it can be learned based on a historical driving record and historical road condition information of a road section B that the road section B is a road section in which accidents occur frequently in a time period C. In this case, when the vehicle to which the vehicle-side device belongs travels in the road section B in the time period C, lane accident information may be set to a highest priority, that is, the vehicle-side device obtains the lane accident information of the road section A.

Therefore, in this embodiment of this disclosure, the cloud server (or the road side unit) transmits the vehicle driving-related information to the vehicle-side device based on the transmission priority, to implement data transmission flexibility.

According to another aspect of embodiments of this disclosure, an embodiment of this disclosure further provides a data transmission method.

FIG. 8 is a flowchart of a data transmission method according to Embodiment 6 of this disclosure.

As shown in FIG. 8, the method includes the following steps.

S201: A network side device receives a first message that is sent by a vehicle-side device and that is used to obtain vehicle driving-related information.

S202: The network side device determines a second message including the vehicle driving-related information, where content or a format of the second message is determined by the network side device based on the first message.

It can be learned from the foregoing examples that, in some embodiments, a vehicle may establish a communication connection to the network side device based on a preset account or a unique identification code (for example, a license plate number). Therefore, after receiving the first message sent by the vehicle, the network side device may track and position a vehicle based on the account or the unique identification code, to obtain the second message related to driving of the vehicle from full dynamic information, where the content or the format of the second message is determined by the network side device based on the first message.

Alternatively, in some other embodiments, if a request sent by the vehicle carries location information of the vehicle, the network side device may obtain, based on the location information, the second message related to driving of the vehicle from full dynamic information, where the content or the format of the second message is determined by the network side device based on the first message.

S203: The network side device sends the second message to the vehicle-side device.

In this embodiment of this disclosure, an autonomous vehicle may send, to the network side device based on a requirement, a request for obtaining corresponding dynamic information. The network side device may determine, based on the request, at least some dynamic information as feedback information, and send the feedback information to the autonomous vehicle, to reduce data transmission load, and implement technical effects of transmitting data flexibly and selectively.

In some embodiments, the first message includes vehicle driving-related information reported or requested by the vehicle-side device to the network side device.

In some embodiments, the reported vehicle driving-related information includes at least one of an autonomous driving level of a vehicle to which the vehicle-side device belongs, a lane on which the vehicle to which the vehicle-side device belongs is located, or a current vehicle speed of the vehicle to which the vehicle-side device belongs, and that the network side device determines a second message including the vehicle driving-related information includes the following step.

The network side device determines the content or the format of the second message based on the at least one of the autonomous driving level of the vehicle to which the vehicle-side device belongs, the lane on which the vehicle to which the vehicle-side device belongs is located, or the current vehicle speed of the vehicle to which the vehicle-side device belongs.

In some embodiments, the requested vehicle driving-related information includes a content type or a level of detail of the vehicle driving-related information, and that the network side device determines a second message including the vehicle driving-related information includes the following step.

The network side device determines the content or the format of the second message based on the content type or the level of detail.

In some embodiments, the first message carries the content type or the level of detail based on a predefined bit coding scheme, and that the network side device determines a second message including the vehicle driving-related information includes the following steps.

The network side device determines the content type or the level of detail based on the first message and the predefined bit coding scheme.

The network side device determines the content or the format of the second message based on the content type or the level of detail.

In some embodiments, that content or a format of the second message is determined by the network side device based on the first message includes that the content of the second message is determined by the network side device as a road condition description or a driving operation instruction based on the first message, or the format of the second message is determined by the network side device as a human recognizable language or a machine recognizable language based on the first message.

In some embodiments, that content or a format of the second message is determined by the network side device based on the first message includes that a binding relationship exists between the content or the format of the second message and the first message, and the content or the format of the second message is determined by the network side device based on the first message and the binding relationship.

In some embodiments, the second message includes vehicle driving-related information of a plurality of content types, and that the network side device determines a second message including the vehicle driving-related information includes the following step.

The network side device determines a transmission priority of vehicle driving-related information of each of the plurality of content types based on the first message.

In some embodiments, vehicle driving-related information of a content type with a higher transmission priority is transmitted in terms of a transmission time sequence, or has a higher level of detail in terms of content or a format.

In some embodiments, the first message includes a time period or a road section in which the vehicle to which the vehicle-side device belongs is driving, and that the network side device determines a transmission priority of vehicle driving-related information of each of the plurality of content types based on the first message includes that the network side device determines the transmission priority of the vehicle driving-related information of each content type based on the time period or the road section.

According to another aspect of embodiments of this disclosure, an embodiment of this disclosure further provides a vehicle-side device.

FIG. 9 is a block diagram of a structure of a vehicle-side device according to an embodiment of this disclosure. The vehicle-side device in this embodiment may perform the data transmission method in the embodiment shown in FIG. 3.

As shown in FIG. 9, the vehicle-side device includes a first sending unit 11 configured to send, to a network side device, a first message used to obtain vehicle driving-related information, and a first receiving unit 12 configured to receive, from the network side device, a second message including the vehicle driving-related information, where content or a format of the second message is determined by the network side device based on the first message.

In some embodiments, the first message includes vehicle driving-related information reported or requested by the vehicle-side device to the network side device.

In some embodiments, the reported vehicle driving-related information includes at least one of an autonomous driving level of a vehicle to which the vehicle-side device belongs, a lane on which the vehicle to which the vehicle-side device belongs is located, or a current vehicle speed of the vehicle to which the vehicle-side device belongs.

In some embodiments, the requested vehicle driving-related information includes a content type or a level of detail of the vehicle driving-related information.

In some embodiments, the first message carries the content type or the level of detail based on a predefined bit coding scheme.

In some embodiments, that content or a format of the second message is determined by the network side device based on the first message includes that the content of the second message is determined by the network side device as a road condition description or a driving operation instruction based on the first message, or the format of the second message is determined by the network side device as a human recognizable language or a machine recognizable language based on the first message.

In some embodiments, that content or a format of the second message is determined by the network side device based on the first message includes that a binding relationship exists between the content or the format of the second message and the first message, and the content or the format of the second message is determined by the network side device based on the first message and the binding relationship.

In some embodiments, the second message includes vehicle driving-related information of a plurality of content types, and the first message is further used by the network side device to determine a transmission priority of vehicle driving-related information of each of the plurality of content types.

In some embodiments, vehicle driving-related information of a content type with a higher transmission priority is transmitted in terms of a transmission time sequence, or has a higher level of detail in terms of content or a format.

In some embodiments, the first message includes a time period or a road section in which the vehicle to which the vehicle-side device belongs is driving, and that the network side device determines a transmission priority of vehicle driving-related information of each of the plurality of content types includes that the network side device determines the transmission priority of the vehicle driving-related information of each content type based on the time period or the road section.

According to another aspect of embodiments of this disclosure, an embodiment of this disclosure further provides a network side device.

FIG. 10 is a block diagram of a structure of a network side device according to an embodiment of this disclosure. The network side device in this embodiment may perform the data transmission method in the embodiment shown in FIG. 8.

As shown in FIG. 10, the network side device includes a second receiving unit 21 configured to receive a first message that is sent by a vehicle-side device and that is used to obtain vehicle driving-related information, a determining unit 22 configured to determine a second message including the vehicle driving-related information, where content or a format of the second message is determined by the determining unit based on the first message, and a second sending unit 23 configured to send the second message to the vehicle-side device.

In some embodiments, the first message includes vehicle driving-related information reported or requested by the vehicle-side device to the network side device.

In some embodiments, the reported vehicle driving-related information includes at least one of an autonomous driving level of a vehicle to which the vehicle-side device belongs, a lane on which the vehicle to which the vehicle-side device belongs is located, or a current vehicle speed of the vehicle to which the vehicle-side device belongs, and the determining unit 22 is configured to determine the content or the format of the second message based on the at least one of the autonomous driving level of the vehicle to which the vehicle-side device belongs, the lane on which the vehicle to which the vehicle-side device belongs is located, or the current vehicle speed of the vehicle to which the vehicle-side device belongs.

In some embodiments, the requested vehicle driving-related information includes a content type or a level of detail of the vehicle driving-related information, and the determining unit 22 is configured to determine the content or the format of the second message based on the content type or the level of detail.

In some embodiments, the first message carries the content type or the level of detail based on a predefined bit coding scheme, and the determining unit 22 is configured to determine the content type or the level of detail based on the first message and the predefined bit coding scheme, and determine the content or the format of the second message based on the content type or the level of detail.

In some embodiments, that content or a format of the second message is determined by the determining unit 22 based on the first message includes that the content of the second message is determined by the determining unit 22 as a road condition description or a driving operation instruction based on the first message, or the format of the second message is determined by the determining unit 22 as a human recognizable language or a machine recognizable language based on the first message.

In some embodiments, that content or a format of the second message is determined by the determining unit 22 based on the first message includes that a binding relationship exists between the content or the format of the second message and the first message, and the content or the format of the second message is determined by the determining unit 22 based on the first message and the binding relationship.

In some embodiments, the second message includes vehicle driving-related information of a plurality of content types, and the determining unit 22 is configured to determine a transmission priority of vehicle driving-related information of each of the plurality of content types based on the first message.

In some embodiments, vehicle driving-related information of a content type with a higher transmission priority is transmitted in terms of a transmission time sequence, or has a higher level of detail in terms of content or a format.

In some embodiments, the first message includes a time period or a road section in which the vehicle to which the vehicle-side device belongs is driving, and the determining unit 22 is configured to determine the transmission priority of the vehicle driving-related information of each content type based on the time period or the road section.

Only one or more of the units in FIG. 9 and FIG. 10 may be implemented by software, hardware, firmware, or a combination thereof. The software or firmware includes but is not limited to computer program instructions or code, and may be executed by a hardware processor. The hardware includes but is not limited to various integrated circuits, for example, a central processing unit (CPU), a digital signal processor (DSP), a field-programmable gate array (FPGA), or an application-specific integrated circuit (ASIC).

According to another aspect of embodiments of this disclosure, an embodiment of this disclosure further provides a vehicle-side device. The vehicle-side device includes a memory and a processor. The memory stores computer program instructions, and the processor runs the computer program instructions to perform the method according to any one of the foregoing embodiments.

FIG. 11 is a schematic diagram of a structure of a vehicle-side device according to an embodiment of this disclosure. The vehicle-side device in this embodiment may perform the data transmission method in the embodiment shown in FIG. 3.

The vehicle-side device may be configured to represent various forms of digital computers, such as a laptop computer, a desktop computer, a workbench, a server, a blade server, a mainframe computer, and another suitable computer. The components shown in this specification, connections and relationships thereof, and functions thereof are merely used as examples, and are not intended to limit the implementations of this disclosure described in this specification.

For example, the vehicle-side device may be a T-Box, a DC, an MDC, an OBU, an internet of vehicles chip, or the like disposed in an autonomous vehicle.

In an example, the vehicle-side device may include at least one processor 101, a communications bus 102, and at least one communications interface 103.

The processor 101 may be a general-purpose CPU, a microprocessor, an ASIC, or one or more integrated circuits configured to control execution of a program in embodiments of this disclosure. In addition, the processor 101 may be connected to a memory 104 through the at least one communications interface 103. The memory 104 may be disposed inside the vehicle-side device, or may be disposed outside the vehicle-side device. For example, the memory 104 may be a register, a cache, or the like inside the vehicle-side device, or the memory 104 may be a storage device disposed outside the vehicle-side device.

In an example, if the vehicle-side device is a telematics box, the telematics box includes at least one processor, a communications bus, and at least one communications interface. In addition, the processor in the telematics box may be connected, through the communications interface, to the storage device disposed outside the telematics box, to obtain, through the communications interface, instructions from the storage device disposed outside the telematics box. When executing the instructions, the processor implements the data transmission method shown in FIG. 3.

Certainly, in some other embodiments, a memory may be disposed inside the telematics box, and is configured to store instructions. The processor obtains the instructions from the memory through the communications bus, and when executing the instructions, the processor implements the data transmission method shown in FIG. 3.

It should be noted that the telematics box is merely used as an example herein for description. The vehicle-side device may alternatively be any one of a DC, an MDC, an OBU, and an internet of vehicles chip, and a principle is the same as that of the example of the telematics box.

In some embodiments, if the memory 104 is the storage device disposed outside the vehicle-side device, the processor 101 may be connected to the external storage device through the communications interface 103, to collect instructions from the external storage device through the communications interface 103. When executing the instructions, the processor 101 may implement the data transmission method in the embodiment shown in FIG. 3.

In some embodiments, if the memory 104 is disposed inside the vehicle-side device, the memory 104 may be a read-only memory (ROM) or another type of static storage device that can store static information and instructions, or a random-access memory (RAM) or another type of dynamic storage device that can store information and instructions. The memory 104 may alternatively be an electrically erasable programmable ROM (EEPROM), a compact disc (CD) ROM (CD-ROM) or another CD storage, an optical disc storage (including a CD, a laser disc, an optical disc, a DIGITAL VERSATILE DISC (DVD), a BLU-RAY optical disc, or the like), a magnetic disk storage medium, another magnetic storage device, or any other medium that can be used to carry or store expected program code in a form of instructions or a data structure and that can be accessed by a computer. However, this is not limited thereto. The memory 104 may exist independently, and is connected to the processor 101 through the communications bus 102. Alternatively, the memory 104 may be integrated with the processor 101.

The memory 104 may be a computer storage medium provided in this disclosure. The memory 104 stores instructions that can be executed by the at least one processor 101, so that the at least one processor 101 performs the data transmission method shown in FIG. 3.

As a computer storage medium, the memory 104 may be configured to store a non-transitory software program, a non-transitory computer executable program, and a module. The processor 101 performs various function applications of the vehicle-side device and data processing by running the non-transitory software program, the instructions, and the module that are stored in the memory 104, that is, implements the data transmission method shown in FIG. 3.

The memory 104 may include a program storage area and a data storage area. The program storage area may store an operating system, an application for realizing at least one function. The data storage area may store data created during use of the vehicle-side device, and the like. In addition, the memory 104 may include a high-speed RAM, and may further include a nonvolatile memory, for example, at least one magnetic disk storage device, a flash memory device, or another nonvolatile solid-state storage device. In some embodiments, the memory 104 may optionally include memories that are remotely disposed relative to the processor 101, and these remote memories may be connected to the vehicle-side device through a network. Examples of the foregoing network include but are not limited to the internet, the internet of vehicles, an enterprise intranet, a local area network, a blockchain network, a mobile communications network, and a combination thereof.

The communications bus 102 may include a path used to transmit information between the foregoing components.

The communications interface 103 may be any transceiver, any IP port, any bus interface, or the like, and is configured to communicate with an internal or external device, the vehicle-side device, or a communications network, for example, the Ethernet, a radio access network (RAN), or a wireless local area network (WLAN). For example, when the vehicle-side device is a functional unit integrated inside a vehicle, the communications interface 103 includes one or more of the following interfaces, for example, a transceiver for communication between the vehicle and an external network, and a bus interface (for example, a controller area network (CAN) bus interface) for communication between the vehicle and another internal unit.

In an implementation, in an embodiment, the processor 101 may include one or more CPUs, for example, a CPU 0 and a CPU 1 in FIG. 11.

In an implementation, in an embodiment, the vehicle-side device may include a plurality of processors, such as the processor 101 and a processor 107 in FIG. 11. Each of the processors may be a single-core (single-CPU) processor, or may be a multi-core (multi-CPU) processor. The processor herein may be one or more devices, circuits, and/or processing cores configured to process data (for example, computer program instructions).

In an implementation, in an embodiment, the vehicle-side device may further include an output apparatus 105 and an input apparatus 106. The output apparatus 105 communicates with the processor 101, and may display information in a plurality of manners. For example, the output apparatus 105 may be a liquid-crystal display (LCD), a light-emitting diode (LED) display apparatus, a cathode-ray tube (CRT) display apparatus, a projector, or the like. The input apparatus 106 communicates with the processor 101, and may receive an input from a user in a plurality of manners. For example, the input apparatus 106 may be a mouse, a keyboard, a touchscreen apparatus, a sensing apparatus, or the like.

When the vehicle-side device shown in FIG. 11 is an internet of vehicles chip, a function/an implementation process of the communications interface 103 may alternatively be implemented through a pin, a circuit, or the like.

In some other embodiments, FIG. 11 may alternatively be a schematic diagram of a structure of a network side device according to an embodiment of this disclosure. The network side device in this embodiment may implement the data transmission method in the embodiment shown in FIG. 8.

The network side device may be configured to represent various forms of digital computers, such as a laptop computer, a desktop computer, a workbench, a server, a blade server, a mainframe computer, and another suitable computer. The components shown in this specification, connections and relationships thereof, and functions thereof are merely used as examples, and are not intended to limit the implementations of this disclosure described in this specification.

In an example, the network side device may include at least one processor 101, a communications bus 102, and at least one communications interface 103.

The processor 101 may be a general-purpose CPU, a microprocessor, an ASIC, or one or more integrated circuits configured to control execution of a program in embodiments of this disclosure. In addition, the processor 101 may be connected to a memory 104 through the at least one communications interface 103. The memory 104 may be disposed inside the network side device, or may be disposed outside the network side device. For example, the memory 104 may be a register, a cache, or the like inside the network side device, or the memory 104 may be a storage device disposed outside the network side device.

For example, if the network side device is a server, the server includes at least one processor, a communications bus, and at least one communications interface. In addition, the processor in the server may be connected, through the communications interface, to the storage device disposed outside the server, to obtain, through the communications interface, instructions from the storage device disposed outside the server. When executing the instructions, the processor implements the data transmission method shown in FIG. 8.

Certainly, in some other embodiments, a memory may be disposed inside the server, and is configured to store instructions. The processor obtains the instructions from the memory through the communications bus, and when executing the instructions, the processor implements the data transmission method shown in FIG. 8.

It should be noted that the server is merely used as an example herein for description. The server may alternatively be any one of a desktop computer, a workbench, and a mainframe computer, and a principle is the same as that of the example of the server.

In some embodiments, if the memory 104 is the storage device disposed outside the network side device, the processor 101 may be connected to the external storage device through the communications interface 103, to collect instructions from the external storage device through the communications interface 103. When executing the instructions, the processor 101 may implement the data transmission method in the embodiment shown in FIG. 8.

In some embodiments, if the memory 104 is disposed inside the network side device, the memory 104 may be a ROM or another type of static storage device that can store static information and instructions, or a RAM or another type of dynamic storage device that can store information and instructions. The memory 104 may alternatively be an EEPROM, a CD-ROM or another CD storage, an optical disc storage (including a CD, a laser disc, an optical disc, a DVD, a BLU-RAY optical disc, or the like), a magnetic disk storage medium, another magnetic storage device, or any other medium that can be used to carry or store expected program code in a form of instructions or a data structure and that can be accessed by a computer. However, this is not limited thereto. The memory 104 may exist independently, and is connected to the processor 101 through the communications bus 102. Alternatively, the memory 104 may be integrated with the processor 101.

The memory 104 may be a computer storage medium provided in this disclosure. The memory 104 stores instructions that can be executed by the at least one processor 101, so that the at least one processor 101 performs the data transmission method shown in FIG. 8.

As a computer storage medium, the memory 104 may be configured to store a non-transitory software program, a non-transitory computer executable program, and a module. The processor 101 performs various function applications of the server and data processing by running the non-transitory software program, the instructions, and the module that are stored in the memory 104, that is, implements the data transmission method shown in FIG. 8.

The memory 104 may include a program storage area and a data storage area. The program storage area may store an operating system, an application for realizing at least one function. The data storage area may store data created during use of the network side device, and the like. In addition, the memory 104 may include a high-speed RAM, and may further include a nonvolatile memory, for example, at least one magnetic disk storage device, a flash memory device, or another nonvolatile solid-state storage device. In some embodiments, the memory 104 may optionally include memories that are remotely disposed relative to the processor 101, and these remote memories may be connected to the network side device through a network. Examples of the foregoing network include but are not limited to the internet, the internet of vehicles, an enterprise intranet, a local area network, a blockchain network, a mobile communications network, and a combination thereof.

The communications bus 102 may include a path used to transmit information between the foregoing components.

The communications interface 103 may be any transceiver, any Internet Protocol (IP) port, any bus interface, or the like, and is configured to communicate with an internal or external device, the network side device, or a communications network, for example, the Ethernet, a RAN, or a WLAN. For example, when the network side device is a functional unit integrated inside a server, the communications interface 103 includes one or more of the following interfaces, for example, a transceiver for communication between the server and an external network, and a bus interface (for example, a CAN bus interface) for communication between the server and another internal unit.

In an implementation, in an embodiment, the processor 101 may include one or more CPUs, for example, a CPU 0 and a CPU 1 in FIG. 11.

In an implementation, in an embodiment, the network side device may include a plurality of processors, such as the processor 101 and a processor 107 in FIG. 11. Each of the processors may be a single-core (single-CPU) processor, or may be a multi-core (multi-CPU) processor. The processor herein may be one or more devices, circuits, and/or processing cores configured to process data (for example, computer program instructions).

In an implementation, in an embodiment, the network side device may further include an output apparatus 105 and an input apparatus 106. The output apparatus 105 communicates with the processor 101, and may display information in a plurality of manners. For example, the output apparatus 105 may be an LCD, an LED display apparatus, a CRT display apparatus, a projector, or the like. The input apparatus 106 communicates with the processor 101, and may receive an input from a user in a plurality of manners. For example, the input apparatus 106 may be a mouse, a keyboard, a touchscreen apparatus, a sensing apparatus, or the like.

According to another aspect of embodiments of this disclosure, an embodiment of this disclosure further provides a vehicle. The vehicle includes the vehicle-side device in the foregoing embodiments.

Internal components of the vehicle are now described by using examples with reference to FIG. 12.

As shown in FIG. 12, the vehicle includes a processor 201, an external memory interface 202, an internal memory 203, a Universal Serial Bus (USB) port 204, a power management module 205, an antenna 1, an antenna 2, a mobile communications module 206, a wireless communications module 207, a sensor 208, a camera 209, and a telematics box 210. It may be understood that the structure shown in this embodiment does not constitute a specific limitation on the vehicle.

The vehicle may interact with the network side device by using the wireless communications module 207.

The sensor 208 includes a radar and other sensors in FIG. 12.

In some other embodiments of this disclosure, the vehicle may include more or fewer components than those shown in the figure, or combine some components, or split some components, or have different component arrangements. In addition, the components shown in the figure may be implemented by hardware, software, or a combination of software and hardware.

The processor 201 may include one or more processing units. For example, the processor 201 may include an application processor (AP), a modem processor, a graphics processing unit (GPU), an image signal processor (ISP), a controller, a video codec, a digital signal processor (DSP), a baseband processor, and/or a neural-network processing unit (NPU). Different processing units may be independent components, or may be integrated into one or more processors. In some embodiments, the vehicle may alternatively include one or more processors 201. The controller may be a nerve center and a command center of the vehicle. The controller may generate an operation control signal based on an instruction operation code and a time sequence signal, to complete control of instruction fetching and instruction execution. A memory may be further disposed in the processor 201, and is configured to store instructions and data. In some embodiments, the memory in the processor 201 is a cache.

In some embodiments, the processor 201 may include one or more interfaces. The interface may include an Inter-Integrated Circuit (I2C) interface, an I2C Sound (I2S) interface, a pulse-code modulation (PCM) interface, a universal asynchronous receiver/transmitter (UART) interface, a mobile industry processor interface (MIPI), a general-purpose input/output (GPIO) interface, a USB port, and/or the like. The USB port 211 is a port that conforms to a USB standard specification, and may be configured to connect to a charger to charge the vehicle.

It may be understood that an interface connection relationship between the modules shown in this embodiment of this disclosure is merely an example for description, and does not constitute a limitation on the structure of the vehicle. In some other embodiments of this disclosure, the vehicle may alternatively use an interface connection manner different from that in the foregoing embodiment, or use a combination of a plurality of interface connection manners.

It should be noted that the vehicle-side device may be the processor 201 in FIG. 12, or may be the telematics box 210 in FIG. 12.

According to another aspect of embodiments of this disclosure, an embodiment of this disclosure further provides a network side device. The vehicle-side device includes a memory and a processor. The memory stores computer program instructions, and the processor runs the computer program instructions to perform the method according to any one of the foregoing embodiments.

According to another aspect of embodiments of this disclosure, an embodiment of this disclosure further provides an internet of vehicles system. The system includes the vehicle-side device according to the foregoing embodiments, and the network side device according to the foregoing embodiments.

In some embodiments, the internet of vehicles system in this embodiment of this disclosure may include the vehicle and the cloud server shown in FIG. 1, and the vehicle-side device described in the foregoing embodiments is disposed in the vehicle.

In some other embodiments, the internet of vehicles system in this embodiment of this disclosure may include the vehicle and the road side unit shown in FIG. 2, and the vehicle-side device described in the foregoing embodiments is disposed in the vehicle.

A person skilled in the art may clearly understand that, descriptions of embodiments provided in this application may be mutually referenced. For ease and brevity of description, for example, for functions of the apparatuses and devices and performed steps that are provided in embodiments of this application, refer to related descriptions in method embodiments of this application. Reference can also be made between various method embodiments and between various apparatus embodiments.

A person skilled in the art may understand that all or some of the steps of the method embodiments may be implemented by using hardware related to program instructions. The program may be stored in a computer-readable storage medium. When the program is executed, some or all of the steps of the method embodiments are performed. The foregoing storage medium includes various media that can store program code, such as a ROM, a RAM, a magnetic disk, or a compact disc.

All or some of the foregoing embodiments may be implemented by using software, hardware, firmware, or any combination thereof. When software is used to implement embodiments, all or some of the embodiments may be implemented in a form of a computer program product. The computer program product includes one or more computer instructions. When the computer program instructions are loaded and executed on a computer, the procedures or functions according to embodiments of the present application are all or partially generated. The computer may be a general-purpose computer, a dedicated computer, a computer network, or another programmable apparatus. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

In the several embodiments provided in this application, it should be understood that the disclosed apparatus and method may be implemented in other manners without departing from the scope of this application. For example, the described embodiments are merely examples. For example, division into the modules or units is merely logical function division and may be other division in an actual implementation. For example, a plurality of units or components may be combined or integrated into another system, or some features may be ignored or not performed. The units described as separate parts may or may not be physically separate, and parts displayed as units may or may not be physical units, and may be located in one position, or may be distributed on a plurality of network units. Some or all the modules may be selected based on actual requirements to achieve the objectives of the solutions of embodiments. A person of ordinary skill in the art may understand and implement embodiments without creative efforts.

In addition, the apparatus and method described herein, and schematic diagrams of different embodiments can be combined or integrated with other systems, modules, technologies, or methods without departing from the scope of this application. In addition, the displayed or discussed mutual couplings or direct couplings or communication connections may be implemented through some interfaces. The indirect couplings or communication connections between the apparatuses or units may be implemented in electronic, mechanical, or other forms.

The foregoing descriptions are merely example implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A vehicle-side device comprising:

a memory configured to store instructions; and at least one processor coupled to at least one memory and configured to execute the instructions to cause the vehicle-side device to:

send, to a network side device, a first message requesting first vehicle driving-related information, wherein the first message either comprises second vehicle driving-related information reported by the vehicle-side device to the network side device or indicates the first vehicle driving-related information requested by the vehicle-side device to the network side device, wherein the first vehicle driving-related information comprises an autonomous driving level of a vehicle in which the vehicle-side device is deployed, and wherein the autonomous driving level comprises a plurality of driving levels; and receive, from the network side device, a second message comprising the first vehicle driving-related information, wherein content of the second message is based on the first message, wherein the content is a road condition description or a driving operation instruction based on the first message, and wherein a format of the second message is a human recognizable language or a machine recognizable language and is based on a driving level of the plurality of driving levels.

2. The vehicle-side device of claim 1, wherein the second vehicle driving-related information further comprises at least one of lane in which the vehicle is located or a current vehicle speed of the vehicle.

3. The vehicle-side device of claim 1, wherein the first message indicates the first vehicle driving-related information by indicating a content type of the first vehicle driving-related information or a level of detail of the first vehicle driving-related information.

4. The vehicle-side device of claim 3, wherein the first message carries the content type or the level of detail based on a predefined bit coding scheme.

5. The vehicle-side device of claim 1, wherein a binding relationship exists between the content or the format and the first message, and wherein the content or the format is further based on the first message and the binding relationship.

6. The vehicle-side device of claim 1, wherein the second message further comprises third vehicle driving-related information of content types, and wherein the at least one processor is further configured to execute the instructions to cause the vehicle-side device to instruct, using the first message, the network side device to determine a transmission priority of corresponding vehicle driving-related information of each of the content types.

7. The vehicle-side device of claim 6, wherein content types with a higher transmission priority are transmitted before the content types with a lower transmission priority, or have a higher level of detail or higher level of a format than the content types with a lower transmission priority.

8. The vehicle-side device of claim 6, wherein the first message further comprises a time period or a road section in which a vehicle that the vehicle-side device is deployed is driving, and wherein the at least one processor is further configured to execute the instructions to cause the vehicle-side device to determine the transmission priority of the first vehicle driving-related information of each content type based on the time period or the road section.

9. A network side device comprising:

at least one memory configured to store instructions; and at least one processor coupled to the at least one memory and configured to execute the instructions to cause the network side device to:

receive, from a vehicle-side device, a first message requesting first vehicle driving-related information, wherein the first message either comprises second vehicle driving-related information from the vehicle-side device or indicates the first vehicle driving-related information requested by the vehicle-side device, wherein the first vehicle driving-related information comprises an autonomous driving level of a vehicle in which the vehicle-side device is deployed, and wherein the autonomous driving level comprises a plurality of driving levels;

determine a second message comprising the first vehicle driving-related information, wherein content of the second message is based on the first message, wherein the content is a road condition description or a driving operation instruction based on the first message, and wherein a format of the second message is a human recognizable language or a machine recognizable language and is based on a driving level of the plurality of driving levels; and send, to the vehicle-side device, the second message.

10. The network side device of claim 9, wherein the second vehicle driving-related information further comprises at least one of a lane in which the vehicle is located or a current vehicle speed of the vehicle, and wherein the at least one processor is further configured to execute the instructions to cause the network side device to further determine the content or the format based on at least one the lane or the current vehicle speed.

11. The network side device of claim 9, wherein the first message indicates a content type of the first vehicle driving-related information, and wherein the at least one processor is further configured to execute the instructions to cause the network side device to further determine the content based on the content type.

12. The network side device of claim 11, wherein the first message carries the content type based on a predefined bit coding scheme, and wherein the at least one processor is further configured to execute the instructions to cause the network side device to determine the content type based on the first message and the predefined bit coding scheme.

13. The network side device of claim 9, wherein the first message indicates a level of detail of the first vehicle driving-related information, and wherein the at least one processor is further configured to execute the instructions to cause the network side device to determine a format based on the level of detail.

14. The network side device of claim 9, wherein a binding relationship exists between the content or the format and the first message, and wherein the content or the format is based on the first message and the binding relationship.

15. The network side device of claim 9, wherein the second message further comprises third vehicle driving-related information of content types, and wherein the at least one processor is further configured to execute the instructions to cause the network side device to determine, based on the first message, a transmission priority of corresponding vehicle driving-related information of each of the content types based on the first message.

16. The network side device of claim 15, wherein vehicle driving-related information of a content type with a higher transmission priority is transmitted preferentially in terms of a transmission time sequence, or has a higher level of detail in terms of content or a format.

17. The network side device of claim 15, wherein the first message further comprises a time period or a road section in which a vehicle that the vehicle-side device is deployed is driving, and wherein the at least one processor is further configured to execute the instructions to cause the network side device to determine the transmission priority of the first vehicle driving-related information of each content type based on the time period or the road section.

18. A computer program product comprising computer-executable instructions that are stored on a non-transitory computer-readable medium and that, when executed by at least one processor, cause a network side device to:

receive, from a vehicle-side device, a first message to obtain first vehicle driving-related information, wherein the first message either comprises second vehicle driving-related information from the vehicle-side device to the network side device or indicates the first vehicle driving-related information requested by the vehicle-side device to the network side device, wherein the first vehicle driving-related information comprises an autonomous driving level of a vehicle in which the vehicle-side device is deployed, and wherein the autonomous driving level comprises a plurality of driving levels;

determine a second message comprising the first vehicle driving-related information, wherein content of the second message is based on the first message, wherein the content is a road condition description or a driving operation instruction based on the first message, and wherein a format of the second message is a human recognizable language or a machine recognizable language and is based on a driving level of the plurality of driving levels; and send, to the vehicle-side device, the second message.

19. The computer program product of claim 18, wherein the second vehicle driving-related information further comprises at least one of a lane in which the vehicle is located or a current vehicle speed of the vehicle, and wherein the at least one processor is further configured to execute the instructions to cause the network side device to further determine the content or the format based on at least one the lane or the current vehicle speed.

20. The computer program product of claim 18, wherein the first message indicates a content type of the first vehicle driving-related information, and wherein the at least one processor is further configured to execute the instructions to cause the network side device to further determine the content based on the content type.

* * * * *